Figure 1:
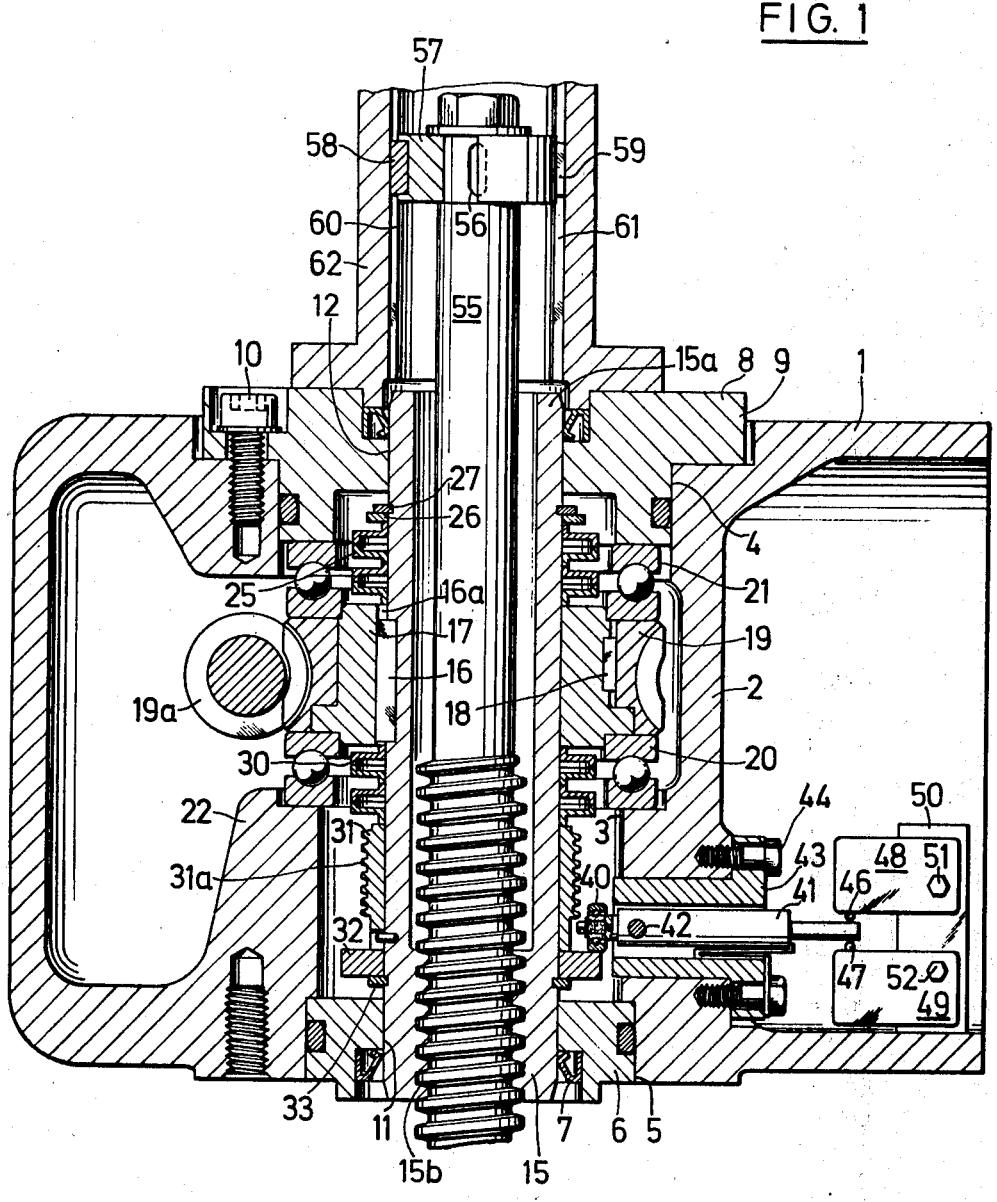

United States Patent [19]

Vyskocil

[11] 3,998,108
[45] Dec. 21, 1976

[54] SERVOMOTOR

[75] Inventor: Jiri Vyskocil, Winterthur, Switzerland

[73] Assignee: Sulzer Brothers Limited, Winterthur, Switzerland

[22] Filed: Mar. 31, 1975

[21] Appl. No.: 563,331

[30] Foreign Application Priority Data

Apr. 3, 1974 Switzerland .................. 4678/74

[52] U.S. Cl. .................... 74/89.15; 74/424.8 R; 116/124 A
[51] Int. Cl.² ........................................ F16H 27/02
[58] Field of Search ............... 74/89.15, 424.8 VA; 116/124 A, 124 D, 124 R, 115

[56] References Cited

UNITED STATES PATENTS

| 565,034 | 8/1896 | Rockwell | 116/124 A |
|---|---|---|---|
| 1,449,554 | 3/1923 | Schoonover | 116/124 D |
| 2,212,572 | 8/1940 | McCarthy et al. | 74/424.8 VA |
| 2,317,529 | 4/1943 | Hodgson et al. | 74/424.8 VA |
| 2,933,937 | 4/1960 | Kron et al. | 74/424.8 VA |
| 3,593,335 | 7/1971 | Wires | 116/124 |

*Primary Examiner*—Samuel Scott
*Assistant Examiner*—Wesley S. Ratliff, Jr.
*Attorney, Agent, or Firm*—Kenyon & Kenyon Reilly Carr & Chapin

[57] ABSTRACT

The servomotor which can be used for a valve uses a worm-type transmission to drive the nut used to move the adjusting spindle. The transmission includes a worm wheel secured to the nut via a ring and a worm gear meshing with the worm wheel and driven off a drive motor. The worm wheel is fixed to the ring and the ring keyed to the nut in a slot so that the nut can move axially of the wheel when the spindle reaches an end position. The pick-off for a position transmitter includes an external thread on the nut which has the same pitch as the nut on the spindle.

4 Claims, 2 Drawing Figures

SERVOMOTOR

This invention relates to a servomotor and particularly to a servomotor for valves.

Heretofore, various types of servomotors have been used for example with valves to move a valve stem or the like. One known type has an adjusting spindle which is secured against rotation, a nut mounted on the spindle to be axially movable via spring elements and a transmission in the form of a spur gear which couples the nut to a drive motor. This type of gear, however, requires the servomotor to be of relatively large dimensions because of the high transmission ratio usually required. Another disadvantage is that a gear of this type is not irreversible or self-locking, so that a brake or locking mechanism is frequently necessary.

Accordingly, it is an object of the invention to provide a servomotor of compact construction and high reliability.

It is another object of the invention to provide a transmission of high transmission ratio for a servomotor.

Briefly, the invention provides a servomotor having a housing, an adjusting spindle mounted in the housing in non-rotatable relation for axial movement, a nut which is threadably mounted on the spindle for axial and rotatable movement relative to the spindle and a transmission for rotating the nut which includes a gear wheel and a worm gear. The gear wheel is secured to the nut for rotation with the nut as well as for axial movement relative to the nut. The worm gear which is driven off a drive motor meshes with the worm wheel for rotating the wheel and nut. In addition, at least one spring is mounted between the nut and worm wheel to permit axial movement of the nut relative to the worm wheel under a restoring force.

The spring elements are preferably constructed as cup springs and are situated on a cylindrical part of the spindle nut.

In cases in which the servomotor is provided with a position transmitter indicating the axial movement of the adjusting spindle, the position transmitter pick-up comprises an external thread on the spindle nut, the pitch of which thread being equl to the pitch of the spindle nut.

Figure 2:
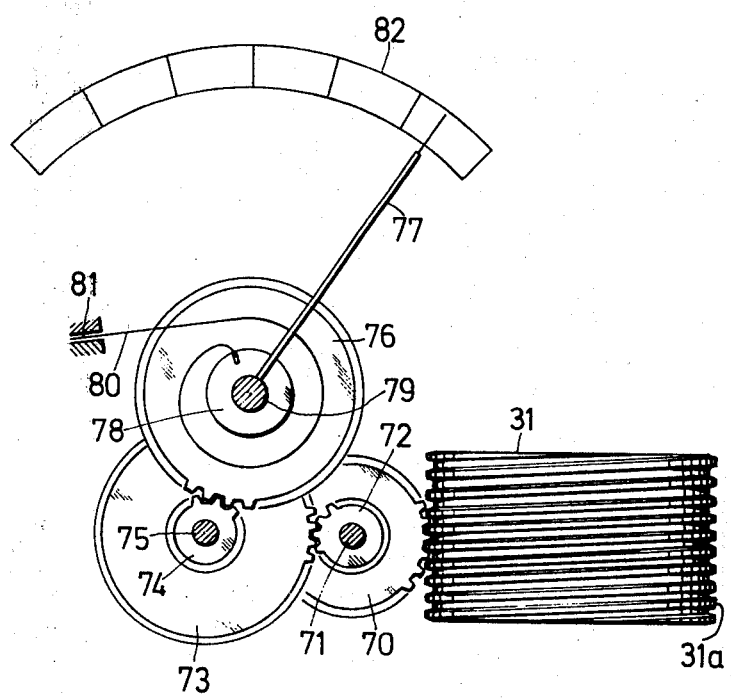

These and other objects and advantages of the invention will become more apparent from the following detailed description and appended claims taken in conjunction with the accompanying drawings in which:

FIG. 1 illustrates a cross-sectional view of a servomotor according to the invention; and FIG. 2 diagrammatically illustrates a position transmitter in accordance with the invention.

Referring to FIG. 1, the servomotor has a housing 1 including a wall 2 in which bores 3, 4 are formed on opposite sides. The lower bore 3, as viewed, extends outwardly to an enlarged bore 5 in which a bearing cap 6 with a seal 7 are secured. Likewise, a bearing cap 8 is centered in the upper bore 4 and is secured to the housing 1 by a screw 10 which passes through a flange 9 of the bearing cap 8.

A spindle nut 15, for example of bronze, which includes a hollow cylindrical extension 15a is mounted in bores 11, 12 of the respective bearing caps 6, 8. The spindle nut 15 has an internal thread 15b by which the nut 15 is threaded onto an adjusting spindle 55. The spindle 55 extends upwardly, as viewed, out of the housing 1 and carries a piston 57 at the upper end. The piston 57 is secured to the piston 55 by a key 56 and is guided by two keys 58, 59 in a pair of axial keyways 60, 61 in a cylinder 62 secured to the bearing cap 8 and surrounding the upper end of the spindle 55. In this way, the spindle 55 is mounted in non-rotatable axially movable relation in the housing 1.

A transmission for moving the spindle 55 off a drive motor (not shown) includes a steel ring 17 connected to the nut 15 via a key 16 so as to rotate therewith. The spindle nut 15 can move axially, however, with respect to the steel ring 17 and in so doing the key 16 slides in an associated keyway 16a in the nut 15. The steel ring 17 is also connected by means of a key 18 to a bronze worm wheel 19 so as to rotate therewith. A worm gear 19a meshes with the worm wheel 19 and is rotated off the drive motor (not shown) so as to rotate the wheel 19 and thus the nut 15.

The steel ring 17 and worm wheel 19 are mounted between two axial ball bearings 20, 21 which are supported between the end face of the bearing cap 6 and a boss 22 of the bore 3. The steel ring 17 is disposed between a pair of springs 25, 30 such as cup springs. The upper spring 25, as viewed, abuts against a ring 26 which is held in place relative to the nut 15 by a snap ring 27 which fits into an annular groove in the nut 15. The lower spring 30 abuts against a sleeve 31 which is fixed to the nut 15 via a pin and which, in turn, abuts a position ring 32. The ring 32 is held in place relative to the nut 15 by a snap ring 33 fitted in a groove in the nut 15. Thus, the nut 15 is mounted in a floating relation to the ring 17 and worm wheel 19.

A switching means is mounted in the servomotor to deactivate the power supply for a given direction of movement of the spindle 55. For example, the switching means includes a lever 41 which is pivotally mounted via a pin 42 in a bushing 43 in the wall 2 of the housing 1. As shown, the bushing 43 is secured by bolts 44 to the housing 1. The lever 41 carries a ball bearing 40 at one end which rests on the position ring 32 within the bore 3. The opposite free end of the lever 41 is situated opposite and between switch pins 46, 47 of two microswitches 48, 49 which are both secured to a support member 50 in the housing 1 via screws 51, 52. These screws 51, 52 may be loosened to permit movement of the microswitches so that the switching time is adjustable. Each microswitch 48, 49 is associated with one of the two directions of rotation of the servomotor drive motor. To this end, the switches 48, 49 are connected by relays in the drive motor power supply lines (not shown) so that when one of the pins 46 or 47 reaches an end position only the power supply for the associated direction of rotation is broken. The drive motor can still be switched on without difficulty in the other direction of rotation.

The servomotor is provided with a position transmitter which indicates the instantaneous position of the spindle 55 and hence the device actuated by the servomotor. The position transmitter is constructed as follows:

The sleeve 31 bears a screwthread 31a whose pitch is equal to the pitch of the inner screwthread 15b of the spindle nut 15. As shown diagrammatically in FIG. 2, a helical gearwheel 70 secured on a shaft 71 engages in the screwthread 31a of the screwthreaded sleeve 31 (in a plane perpendicular to the drawing plane). A pinion 72 is also mounted on the shaft 71 and meshes with a gearwheel 73. The gearwheel 73, in turn, is secured together with a pinion 74 on a shaft 75. The pinion 74 engages in a gearwheel 76 connected to a pointer 77. The gearwheel 76 is secured on a shaft 79 together with a support 78 for a spiral spring 80 which is secured to the servomotor housing 1 at a free end 81. The purpose of the spiral spring 80 is to ensure that the same flank of the screwthread 31a is always in contact with the helical gearwheel 70 irrespective of the direction of movement of the servomotor. A scale 82 is secured to the servomotor housing 1 to allow a read off of the position of the pointer 77 and, hence, the position of the adjusting spindle 55. Of course, the optical indicating system described may be replaced by other systems, such as an electrical position transmitter.

The servomotor operates as follows:

When an adjustment command reaches the servomotor drive motor (not shown), the spindle nut 15 is rotated in either direction via the transmission 19, 19a and the adjusting spindle 55 is moved up or down. For example, if the adjusting spindle 55 is connected to a valve stem of a valve (not shown), the adjusting spindle 55 causes the valve to open or close. At the same time, the pitch circle of the helical gearwheel 70 reproduces the movement of the spindle 55 with respect to the servomotor housing 1. The position of the pointer 77 thus indicates the position of the adjusting spindle 55 and, hence, also the operating position of the valve actuated by the spindle 55.

Depending upon the direction of movement of the adjusting spindle 55, the spindle nut 15 will yield to the restoring force of either set of cup springs 25 or 30 during rotation. For example, the spindle nut 15 will yield to the restoring force of the lower cup spring set 30 when rotating in the direction in which the adjusting spindle 55 moves downwards. In these conditions, the spindle nut key 16 slides in the keyway 16a in the steel ring 17. The extent to which the spindle nut 15 yields is dependent upon the spindle loading. As soon as the spindle nut 15 yields in excess of a given value, for example if the adjusting spindle 55 reaches the end position on the closing of a valve, the nut 15 begins to move up the spindle 55 and the position ring 32 turns the lever 41 in the clockwise direction, as viewed, via the ball bearing 40. Thus, the lever 41 actuates the pin 47 of the microswitch 49 and the associated relay breaks the current to the appropriate supply line to the drive motor. Since the switch 46 has not been actuated, the drive motor can, if required, be immediately switched on for the opposite direction of rotation of the spindle nut 15, i.e. the opposite direction of movement of the spindle 55. In these conditions, the cup spring set 30 first presses the spindle nut 15 back into the neutral initial position.

Instead of supporting the spindle nut 15 by way of two sets of cup springs 25, 30, the nut 15 may be supported on the worm wheel 19 by way of just one set, for example set 30, for example if there is no need for a resilient support for the opposite direction of movement of the adjusting spindle 55.

What is claimed is:

1. A servomotor comprising
a housing;
an adjusting spindle mounted in said housing in non-rotatable relation thereto for axial movement;
a nut threadably mounted on said spindle for axial and rotatable movement relative to said spindle;
a transmission for rotating said nut, said transmission including a worm wheel secured to said nut for rotation therewith and for axial movement relative to said nut, and a rotatable worm gear meshing with said worm wheel for rotating said wheel an nut;
at least one spring mounted between said nut and said worm wheel to permit axial movement of said nut relative to said worm wheel under a restoring force; and
a position transmitter for indicating the axial movement of said spindle, said position transmitter having a pick-up including a sleeve fixed on said nut, said sleeve having an external screw thread of a pitch equal to the pitch of said nut.

2. A servomotor as set forth in claim 1 which includes a pair of said springs mounted on opposite sides of said worm wheel.

3. A servomotor as set forth in claim 2 wherein said springs are cup springs and are located about a cylindrical part of said nut.

4. A servomotor for a valve comprising
a housing;
an adjusting spindle for connection to a valve stem, said adjusting spindle being non-rotatably mounted in said housing for axial movement;
a nut threadably mounted on said spindle;
a transmission for rotating said nut, said transmission including a worm wheel secured to said nut for rotation therewith and for axial movement relative thereto, and a rotatable worm gear meshing with said worm wheel for rotating said worm wheel and nut;
at least one spring mounted between said nut and said worm wheel for compressing in response to an axial movement of said nut on said spindle from an initial position to produce a biasing force on said nut to restore said nut to said initial position;
a sleeve fixed on said nut and having an external screw thread of a pitch equal to the pitch of said nut;
at least one gearwheel meshing with said screw thread of said sleeve;
a pointer connected with said gearwheel to indicate the position of said spindle; and
a scale secured to said housing to allow a read off of the position of said pointer.

* * * * *